May 30, 1961  B. F. W. HEYER  2,986,032
ENGINE PARAMETER ANALYZER
Filed March 11, 1958  3 Sheets-Sheet 1
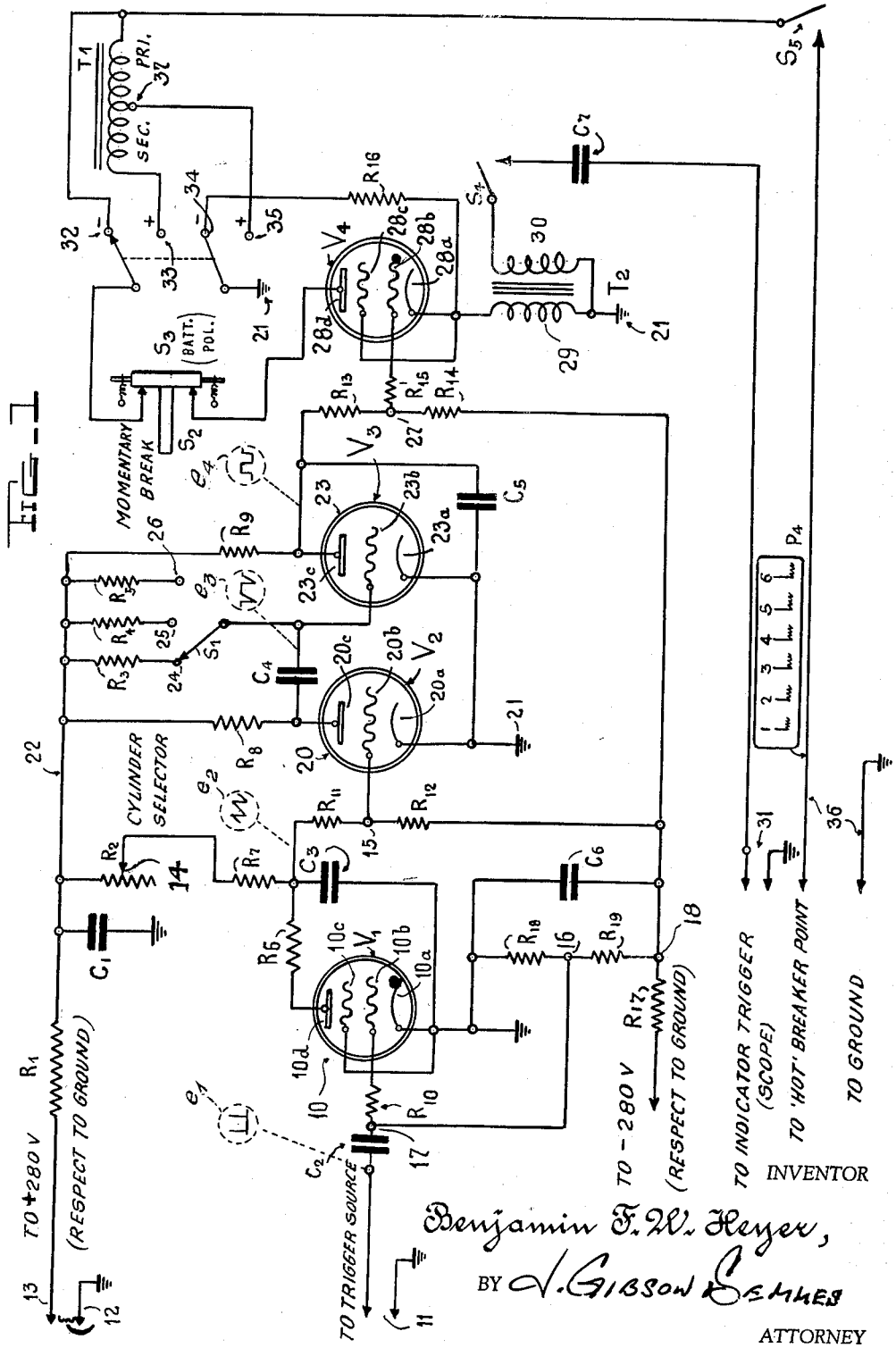
INVENTOR
Benjamin F. W. Heyer,
BY V. Gibson Semmes
ATTORNEY

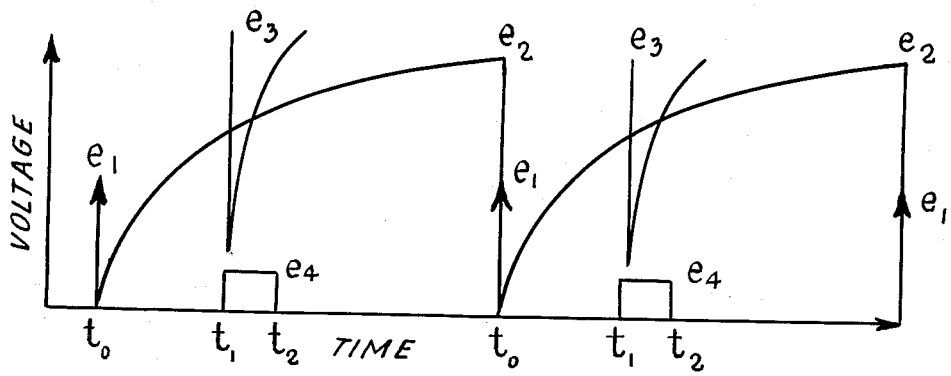
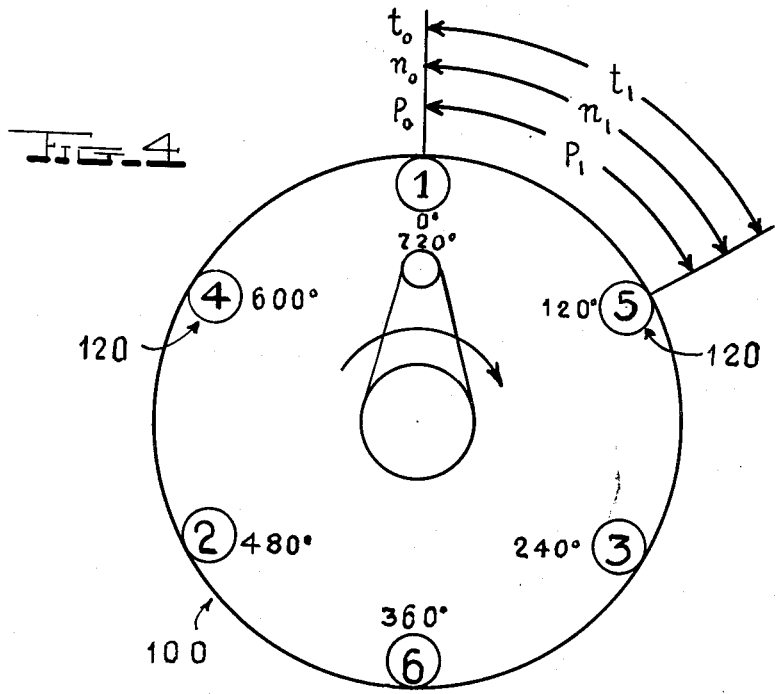

May 30, 1961  B. F. W. HEYER  2,986,032
ENGINE PARAMETER ANALYZER
Filed March 11, 1958  3 Sheets-Sheet 3
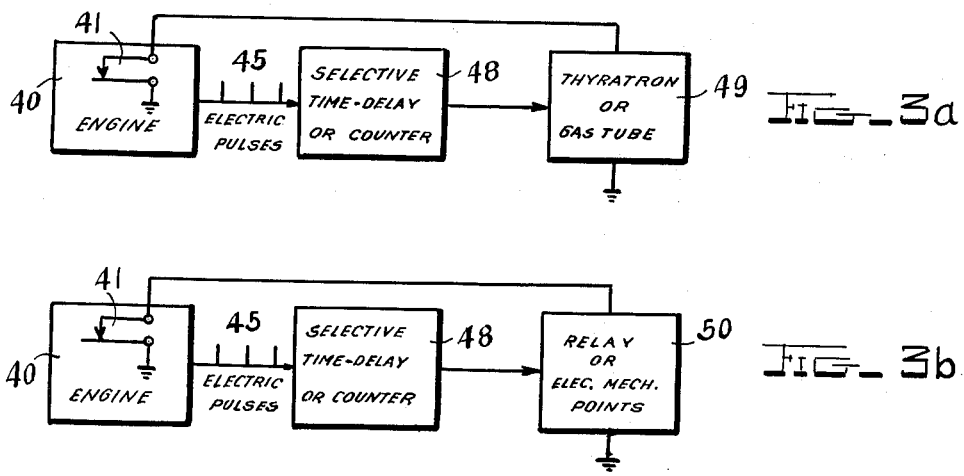
INVENTOR
Benjamin F. W. Heyer,
BY J. Gibson Semmes
ATTORNEY even# United States Patent Office 2,986,032
Patented May 30, 1961

2,986,032
ENGINE PARAMETER ANALYZER
Benjamin F. W. Heyer, Mayfair Lane, Greenwich, Conn.

Filed Mar. 11, 1958, Ser. No. 720,688

18 Claims. (Cl. 73—116)

My invention relates to a combustion engine analyzing system, and more particularly to method and apparatus for electronically determining the relative contribution of each cylinder to overall performanace of an engine.

In accordance with the present invention, a disabling action, is derived from the engine at a rate proportional to the speed of the engine crankshaft and in a definite phase relation thereto, this disabling action being used to cause by electronic means any desired cylinder or cylinders of the engine to become inoperative. By selectively rendering any desired cylinder inoperative while the engine is still running, and without affecting the operation of the other cylinders, an analysis of the resulting engine performance enables ready determination of the contribution of a particular cylinder. This analysis reflects either individually or as compared to other cylinders of the engine mechanical operating conditions within the cylinders, heretofore obtainable in crude fashion only, with the time consuming and unwieldy compression test and/or mechanical or manual ignition shorting devices.

An object of my invention is to provide an improved method of determining the relatively contribution of each cylinder to overall performance of a combustion engine.

Another object of my invention is to provide an improved method of determining the relative contribution of each cylinder to overall performance of a combustion engine, by selectively rendering any desired cylinder inoperative through electronic means while the engine is running, and thereafterwards analyzing the resulting engine performance whereby the said contribution of a particular cylinder as compared to other cylinders is readily determined at a glance.

Yet another object of my invention is to provide an improved method of determining the relative contribution of each cylinder to overall performance of a combustion engine, by selectively disabling electronically the cylinders one or more at a time, simultaneously measuring the change in the engine parameters, i.e., performance output including: speed, vacuum, etc., as each of the cylinders is disabled, and then identifying such measurement with the specific cylinder or cylinders so disabled.

Still another object of my invention is to provide an improved combustion engine analyzing system wherein a trigger pulse is derived from the engine in such manner that the impulses occur at a rate proportional to engine r.p.m., said impulses being used directly or in combination with either electronic time delay measurement, electronic phase measurement, or an electronic engine events counting system to cause any desired cylinder or cylinders to become inoperative.

A further object of my invention is to provide improved combustion engine analyzing systems for determining the contribution of each cylinder to overall performance of the engine wherein any desired cylinder is selectively rendered inoperative while the engine is running, by preventing ignition in one or more cylinders through electronic means, the cylinders being selected by electronic time measurement, electronic numerical counting, or electronic phase measurement from the beginning of a complete engine cycle to the position of the disabled cylinder or cylinders to be disabled in the firing order of the engine.

Yet a further object of my invention is to provide an improved internal combustion engine analyzer constructed and arranged whereby an analysis of the mechanical condition of an engine can be accomplished in a matter of a few minutes, and without the necessity of physically shorting out spark plugs either at the distributor cap or at the plugs and avoiding the necessity of attaching mechanism or mechanical appurtenances such as adaptors, cams, shafts or complete transmission systems for recording instruments.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

By way of clarification the following definitions prevail in the ensuing description:

(a) "Complete engine cycle" is: All engine events occurring from the ignition of a given cylinder until just preceding the next succeeding ignition of said given cylinder.

(b) "Phase" is the relation in angular degrees between engine crank shaft position and ignition events selected for disabling.

(c) "Disabling device" herein shall include a device which renders the ignition of a given cylinder or cylinders inoperative.

(d) "Time" herein shall be the elapsed time between the commencement of a complete engine cycle and the occurrence of the ignition event selected for disabling.

(e) "Count" is in the number of ignition events occurring between commencement of a complete engine cycle and the ignition event selected for disabling.

(f) "Electronic" or "electronically," as used herein, shall be defined as embracing devices in the art which have as components thereof either electron tubes or solid state devices, performing similar functions as electron tubes.

In order to make my invention more clearly understood, I have shown in the accompanying drawings a means for carrying the same into practical effect, without limiting the improvements in their useful applications to the particular constructions, which, for the purpose of explanation, have been made the subject of illustration.

In the drawings:

Figure 1 illustrates one embodiment of the present invention, the arrangement of the components and associated circuits being shown schematically;

Fig. 2 is a view of the voltage waveforms at the grid of one of the triodes of the trigger and time delay system of Fig. 1;

Figs. 3a and 3b are diagrammatic views of modified systems using various types of point shunting and synchronizing units; and Fig. 4 is a diagrammatic representation of the relation between engine crankshaft position and "phase," "time," and "count."

Referring to the drawings, and more particularly to Fig. 1, there is shown one embodiment of the present invention wherein an electrical pulse is derived from the high tension ignition pulse to a spark plug of a combustion engine cylinder 1, which pulse activates the time delay circuit with a selectable delay, as will be described more fully hereinafter. Activation of the time delay circuit causes a thyratron $V_4$ to become conductive to any suitable applied positive pulse for a short length of time, at a selectable time after occurrence of the No. 1 cylinder ignition pulse. By making the selectable time delay equal to approximately the time between normal firing time of this cylinder and another cylinder N, not shown, the thyratron $V_4$ is made conductive at the firing time of cylinder N, and of cylinder N only, and means are provided whereby the conducting thyratron disables the ignition of said cylinder, thereby rendering it inoperative. This is accomplished by shunting the breaker points in the ignition coil by the thyratron. When the points are open, the thyratron conducts, instead of the points, thereby preventing rapid change of magnetic flux in the ignition coil.

It will thus be seen that any desired cylinder, except No. 1 can be disabled. To disable this cylinder by setting the time delay to zero is not a solution since an ignition pulse must be present in order to initiate the time delay circuit. Setting the time delay equal to one complete engine cycle causes only even occurrences, that is to say, 2nd, 4th, 6th, etc., having no previous initiation pulses.

In order to permit cylinder No. 1 to be shorted on all fittings, a special pulse generating circuit is employed in the cathode circuit of the shorting thyratron to generate a trigger pulse each time cylinder 1 is shorted, thus taking the place of the pulse ordinarily derived from the high tension lead of the cylinder, and allowing the time delay circuit to be self-triggering. This self-triggering pulse can also be used to synchronize oscilloscopes or other auxiliary equipment such as tachometers, timing lights, and the like, which will stay in synchronism with the engine even though the normal synchronized pulse from the high tension lead is no longer present. For ignition systems having the "hot" breaker point negative with respect to ground, for example, those with the plus terminal of the battery grounded, a suitable transformer is used to reverse the polarity so that a positive pulse is applied to the thyratron plate.

Reference again being had to Fig. 1, the thyratron $V_1$, which controls the cycle of operations, includes a cathode $10a$, a control grid $10b$, a shield grid $10c$, and anode $10d$ contained within an envelope 10. The control grid and cathode are connected through an input system to a trigger source such as the ignition circuit of a combustion engine connected at terminals 11 through condenser $C_2$ and resistor $R_{10}$. The output system of the thyratron $V_1$ is powered from a direct current source connected to terminals 12 where the positive side of the source which may be 280 volts, e.g., connects to terminal 13 leading through resistance $R_1$ and a shunt path to ground containing condenser $C_1$ and constituting a distributing path for potential to the anodes of the several tubes embodied in the circuit. The anode potential is supplied to plate $10d$ of the thyratron $V_1$ through the adjustable resistor $R_2$ where adjustable tap, movable thereover connects through resistance $R_7$ to the plate circuit of thyratron $V_1$ and through resistance $R_6$ to the plate $10d$, and a condenser $C_3$ is connected between anode $10d$ and cathode $10a$.

The output circuit of the thyratron $V_1$ contains a series path which includes a pair of resistances $R_{11}$ and $R_{12}$ having a mid-tap 15 therebetween and connected in a series through another pair of resistances $R_{18}$ and $R_{19}$, having a mid-tap 16 therebetween. The end of resistance $R_{11}$ connects with plate $10d$ through resistance $R_6$ while the end of resistance $R_{18}$ connects with the cathode $10a$ of the thyratron $V_1$. The resistances $R_{18}$ and $R_{19}$ are shunted by a condenser $C_6$, and constitutes part of the voltage divider system for rendering the thyratron nonconductive. The mid-tap 16 connects to a point 17 intermediate condenser $C_2$ and resistance $R_{10}$ in the input circuit of the thyratron. The negative side of the voltage source connected to terminals 12 connects through the resistance $R_{17}$ to the point 18 intermediate the two sets of series connected resistances $R_{11}$—$R_{12}$ and $R_{18}$—$R_{19}$. The resistances $R_{11}$—$R_{12}$ serve as a network for biasing the control grid $20b$ of the high MU tube which contains cathode $20a$, the control grid $20b$ and the plate $20c$. The input circuit to high MU tube 20 connects between tap 15 and between resistances $R_{11}$ and $R_{12}$ and ground indicated at 21, and the plate potential for tube 20 is supplied from the positive distributor bus 22 through resistance $R_8$. The output circuit of high MU tube 20 connects through condenser $C_4$ to the control grid $23b$ of the cascaded high MU tube 23 containing cathode $23a$ connected to ground 21 and anode $23c$ connected through resistance $R_9$ to the positive distributor bus 22. The input circuit of high MU tube 23 has the bias thereon controlled through a selector, for the number of cylinders of the engine to be tested, comprising a switch $S_1$ operative over contacts 24, 25, and 26 for selectively including resistances $R_3$, $R_4$, or $R_5$, in circuit between the positive distributor bus 22 and control grid $23b$ of high MU tube 23.

The switch $S_1$ permits the selection of time period over which the thyratron $V_4$ can conduct. In the case of a four-cylinder engine, this time period can be made, e.g., twice as long as for eight-cylinder engines, thus requiring no change of adjustment of resistance $R_2$ for greater change in revolutions per minute of four-cylinder engines as compared to eight-cylinder engines. The output of high MU tube 23 is bridged by a condenser $C_5$, and includes a pair of resistances $R_{13}$ and $R_{14}$ connected in series with a mid-tap 27 therebetween and connected between the plate $23c$ and the negative side of the high potential source connected to terminals 12. The resistances $R_{13}$—$R_{14}$ serve as a voltage divider for the control grid of a thyratron $V_4$ through a resistance $R_{15}$.

The thyratron $V_4$ includes cathode $28a$, control grid $28b$, shield grid $28c$, and anode $28d$, within an envelope 28. The input circuit to thyratron $V_4$ is completed through the primary winding 29 of transformer $T_2$ which connects to ground 21, the input circuit including resistance $R_{15}$ connected to tap 27 in the voltage divider circuit $R_{13}$—$R_{14}$. Transformer $T_2$ includes a secondary winding 30 connected to ground at one end and connected at the other end through a switch $S_4$ for opening and closing the circuit through condenser $C_7$ leading to the indicator trigger of the oscilloscope connected to output terminals 31. When the switch $S_4$ is closed, the self-generated trigger pulse can thus be used to cause thyratron $V_4$ to conduct on both even and odd cylinder No. 1 firings.

The output circuit of the thyratron $V_4$ extends from anode $28d$ through a momentary break switch $S_2$ and to the polarity selector $S_3$ which permits operations with either polarity at the breaker points of the engine, thus enabling the analyzer to meet different conditions encountered in the testing of engines of different makes. The polarity selector $S_3$ is operative over selector contacts 32, 33, and 35. Contact 32 connects through switch $S_5$ in the circuit to the "hot" breaker points connected to terminals 36. Contact 33 connects through auto-transformer $T_1$ including primary and secondary windings in series with a tap 37 therebetween. Contact 34 connects to one end of resistance $R_{16}$ which connects through the primary winding 29 of transformer $T_2$ to ground 21 for effectively shunting the said primary winding whereby the breaker points with "hot" point positive are effectively shorted or shunted by connecting them directly in parallel with a series combination of thyratron $V_4$ and the primary of transformer $T_2$ in parallel with resistance $R_{16}$.

Contact 35 connects to tap 37 in the auto-transformer $T_1$. For breaker points with "hot" point negative, the points are shunted by connecting them in parallel with the primary of auto-transformer $T_1$, the secondary of which is shunted by a series combination of thyratron $V_4$ and the primary winding of transformer $T_2$ and transformer $T_1$ thus reversing phase. Transformer $T_1$ has sufficient primary inductance to offer only small "loading," with respect to the points, when the thyratron is non-conducting, and yet has sufficiently low resistance and coupling to heavily shunt the points when the thyratron is conducting. The transformer $T_2$ has a primary winding 29 which is of very low inductance and resistance, thus offering only a very small series impedance. The breaker points indicated at 36 permit an analysis to be made of all the cylinders of the engine which I have indicated at $P_4$ by reference symbols 1–6.

In the operation of the analyzer of my invention, a suitable trigger pulse derived from the high tension lead of #1 cylinder, e.g., is applied to the grid $10b$ of the thyratron $V_1$ through terminals 11 for a time which renders thyratron $V_1$ conductive until condenser $C_3$ is discharged. The thyratron $V_1$ is normally biased so as to be nonconducting by voltage divider $R_{18}$—$R_{19}$. Immediately after discharge, condenser $C_3$ is charged positively by current flowing through resistances $R_2$ and $R_7$, and at a rate determined by the adjustment of tap 14 on selector control $R_2$. A sawtooth wave form $e_2$ is generated across condenser $C_3$ at the rate of one sawtooth per input pulse $e_1$ (Fig. 1) and the sawtooth slope is determined by the setting of cylinder selector $R_2$.

The sawtooth wave form $e_2$ is applied to the grid $20b$ of the high MU triode $V_2$ through the voltage divider $R_{11}$—$R_{12}$ from tap 15. The voltage divider $R_{11}$—$R_{12}$ biases tube $V_2$ in such a manner that tube $V_2$ remains nonconducting until the sawtooth has reached approximately two-thirds of its maximum value near the point of maximum $de/dt$ for a given time after initiation. The positive $de/dt$ on the grid $20b$ of tube $V_2$, when it becomes conductive, together with the high MU of tube $V_2$ cause the plate $20c$ of tube $V_2$ to rise to a value of approximately 250 volts and to fall to a minimum positive value of approximately 25 volts.

Referring to Fig. 2, the characteristic curves for the cycles of operation are shown. At a time $t_1$ in the first part of curve $e_3$, the time between $t_0$ and $t_1$ is determined by the setting of resistance $R_2$. This rapid decrease in voltage transferred to the grid $23b$ of high MU tube 23 causes non-conduction. Tube $V_3$ is normally fully conducting since the grid is held slightly positive by any one of the selected resistances $R_3$, $R_4$, or $R_5$ by means of selector switch $S_1$ moving over contacts 24, 25, or 26. Nonconduction continues until condenser $C_4$ discharges through resistances $R_3$, $R_4$, or $R_5$ to a point at which tube $V_3$ again conducts at a time $t_2$, as indicated in Fig. 2. The time between $t_1$ and $t_2$ is thus determined by the ratio $R/C$ of condenser $C_4$ and resistances $R_3$, $R_4$, or $R_5$. The voltage wave forms at the grid $23b$ of tube $V_3$ are indicated in Fig. 1 at $e_3$, while the voltage wave forms at the plate $23c$ of tube 23 are indicated at $e_4$ in Fig. 1. Fig. 2 shows the relationships of these wave forms plotted with voltage as ordinates and time as abscissa. The voltages $e_4$ are supplied through voltage divider $R_{13}$—$R_{14}$ to the control grid $28b$ of thyratron $V_4$, the voltage divider normally biasing the thyratron to be non-conducting. Thyratron $V_4$ thus conducts only when both tube $V_3$ is non-conducting between times $t_1$ and $t_2$ indicated in Fig. 2, and when a positive voltage is applied to plate $28d$. Application of a positive voltage to the plate $28d$ of thyratron $V_4$ makes the thyratron conductive only at times between $t_1$ and $t_2$. The times are selectable by cylinder selector 14 and the differential $t_1$–$t_2$ is selectable by switch $S_1$.

Referring particularly to the #1 cylinder trigger, the thyratron $V_4$ only conducts at times immediately after opening of points, and when the grid is not negative. Hence, when $t_1$–$t_0$ is set to equal one engine cycle, i.e., the time between successive #1 cylinder firings, since normal trigger is present only on even cylinder firings, and not on odd firings. The conduction current of thyratron $V_4$ on odd cylinder firings, however, also flows through the primary winding 29 of transformer $T_2$, causing a trigger pulse to be generated in the secondary winding 30 on these odd firings. When the switch $S_4$ is closed this self-generated trigger pulse can thus be used to cause thyratron $V_4$ to conduct on both even and odd #1 cylinder firings.

The controls which have heretofore been described may be summarized as having the following functions:

$R_2$—(Cylinder selector). Adjusts time delay between trigger pulse and thyratron conduction—thus selecting cylinder which is shunted.

$S_1$—(Number of cylinders selector). Permits selection of time period $t_2$–$t_1$ thyratron $V_4$ can conduct. For four-cylinder engines this, for example, can be made twice as long as for an eight-cylinder engine, thus requiring no change of adjustment of $R_2$ for greater change in r.p.m. of four-cylinder engines as compared to eight-cylinder disabled.

$S_3$—(Polarity selector). Permits operations with either polarity at breaker points.

$S_4$—Permits shunting of particular cylinder from which basic trigger is obtained.

$S_5$—Completely removes shunting action or circuitry regardless of setting on all other controls.

The system of my invention may be embodied in many types of circuits and assemblies. For example, there may be provided a variety of forms of point shunting units, synchronizing units, in various applications as follows:

(A) *Types of point shunting units*

(1) Thyratrons:
  Single to double (with and without transformer).
  Hot and cold cathode.
(2) Vibrator driven points
(3) Coil driven points (B) *Types of synchronizing units*

(1) Time delay type:
  (a) Thyratron—hot and cold cathode.
  (b) Hard tube.
  (c) Gas tube—other than thyratron.
  (d) Electro mechanical—thermal, i.e., agastat-blinkers.

(C) *Areas of application*

(1) "Standard" combustion engines.
(2) Fuel injection engines.
(3) Diesel (shunting in non-electrical).

Referring to Figs. 3a and 3b, there are shown two examples employing the system and method of my invention.

In Fig. 3a the system of my invention employs an adjustable time delay or counting system 48, connected with a thyratron or gas tube indicated at 49, which is coordinated in operation with the ignition circuit 41. In this figure the combustion engine is indicated generally at 40, including the ignition circuit broadly indicated at 41, comprising alternately selective primary and secondary elements shunted to ground.

In Fig. 3b there is shown an application of my invention to a system embodying the adjustable time delay circuits or counting system 48, but used in connection with a relay system or electro-mechanically operated points. The relay system or the like is generally indicated at 50.

Referring to Fig. 4, which is a schematic view of the system 100, the relative position of engine crank shaft and the ignition events relative to "time," "count," and "phase" angle, are shown for one complete engine cycle. Time, count, and phase angle at the start of the cycle are represented by the symbols $t$, $n$, and $p$, respectively. The symbols $t_1$, $n_1$, and $p_1$ are time, number and phase angle at the first ignition event. At any speed, $n_1$ is one (1), and $p_1$ is 120° (crankshaft). The value of $t_1$ will depend upon engine speed (at 100 r.p.m. $t_1$=20 milliseconds). Integral multiples of the parameters shown can be used to sense electronically the disabling function for a selected cylinder or cylinders. The cylinder numbers 120 at the periphery identify their relative position in the engine and not their order of firing, which order is apparent from the clockwise arrangement on the schematic. For example, cylinder #6 is the fourth to fire in the engine cycle etc.

Both phase ($p$) and number or count ($n$) are not affected by engine speed whereas time ($t$) is inversely proportional to speed. Ipso facto, devices employing phase and counting as selective means for disabling are independent of engine speed, time measurement devices, on the contrary, being sensitive to the speed of the engine.

While I have shown and described a preferred embodiment of my invention, it will be appreciated that other combinations of apparatus may be employed in carrying out the method of my invention, and I wish it to be understood that I do not confine myself to the precise details of the arrangement set forth herein by way of illustration, as it is apparent that many changes and variations may be made therein, by those skilled in the art, without departing from the spirit of the invention or exceeding the scope of the appended claims.

What is claimed is:

1. In portable analyzing systems for multi-cylinder spark plug ignition internal combustion engines, a universally applicable method of testing relative performance of each cylinder of an operating engine including the steps of: applying a source of power to the analyzing system; electrically connecting the analyzing system to a common coil-distributor terminal, one spark plug cable and ground, setting cylinder disabling action time interval relative to number of cylinders and engine testing speed; thereafter running the engine at a predetermined fixed throttle opening; selecting the absolute time interval between the firing of said one spark plug and the firing of the spark plug which is to be selectively disabled; thence selectively disabling electronically one or more at a time, all cylinders of the engine; simultaneously measuring the change, if any, of one or more of the engine parameters as each one or more of said cylinders is disabled; and simultaneously identifying the measurement with said specific cylinder or cylinders so disabled.

2. The method according to claim 1 including the step of compensating for polarity of the ignition system following setting disabling action time control.

3. Portable apparatus for analyzing multi-cylinder internal combustion engines generating ignition pulses, comprising a source of electrical energy; conductive means connecting apparatus to a common coil-distributor terminal, any one spark plug circuit and ground, said apparatus including in connection: an electronic cylinder disabling circuit having a high impedance state and a low impedance state; a first electronic timing circuit for predetermining the duration of the low impedance state; a second electronic timing circuit for determining the interval between the firing of said spark plug and the start of the low impedance state of the cylinder disabling circuit, the time duration of which has been predetermined by the first electronic timing circuit, said second electronic timing circuit being triggered from said conductive connection to a spark plug circuit, whereby the low impedance state of said cylinder disabling circuit selectively, by means of the second electronic timing circuit, disables one or more engine cylinders through the common coil-distributor, terminal connection and ground making possible a determination of the relative contribution of said one or more cylinders to overall engine performance.

4. Apparatus according to claim 3 further comprising means associated with said second timing circuit for cylinder identity.

5. Apparatus according to claim 3 further including cylinder identifying means common to said apparatus in the form of oscillographic presentation of engine ignition signal.

6. Apparatus according to claim 3 including torque indicating means in combination to determine relative contribution of said one or more cylinders.

7. Apparatus according to claim 3 including engine horsepower indicating means in combination to determine relative contribution of said one or more cylinders.

8. Apparatus according to claim 7 including manifold vacuum indicator means in combination to determine relative contribution of said one or more cylinders.

9. Apparatus according to claim 7 including engine speed measuring means in combination to determine relative contribution of said one or more cyliders.

10. Apparatus according to claim 3 including ignition system polarity compensating means.

11. Apparatus according to claim 10 including cylinder identifying means common to said apparatus in the form of oscillographic presentation of engine ignition signal.

12. Apparatus according to claim 10 including engne horsepower indicating means in combination to determine relative contribution of said one or more cylinders.

13. Apparatus according to claim 10 including engine speed measuring means in combination to determine relative contribution of said one or more cylinders.

14. Apparatus according to claim 10 in which manifold vacuum indicator means is combined to determine relative contribution of said one or more cylinders.

15. Apparatus according to claim 10 in which torque indicating means is combined to determine relative contribution of said one or more cylinders.

16. Apparatus according to claim 14 including ignition system polarity compensating means.

17. Apparatus according to claim 3 in which the cylinder disabling circuit is a thyratron circuit.

18. Apparatus according to claim 10 in which the cylinder disabling circuit is a thyratron circuit.

References Cited in the file of this patent

UNITED STATES PATENTS

| | | |
|---|---|---|
| Re. 23,150 | Sexton | Sept. 20, 1949 |
| 2,608,093 | Traver | Aug. 26, 1952 |
| 2,652,727 | Richardson et al. | Sept. 22, 1953 |
| 2,842,956 | Uyehara et al. | July 15, 1958 |

UNITED STATES PATENT OFFICE

CERTIFICATE OF CORRECTION

Patnet No. 2,986,032                                                  May 30, 1961

Benjamin F. W. Heyer

It is hereby certified that error appears in the above numbered patent requiring correction and that the said Letters Patent should read as corrected below.

Column 1, line 18, for "performanace" read -- performance --; line 31, after "engine" insert a comma; same column 1, lines 35 to 37, strike out "An object of my invention is to provide an improved method of determining the relatively contribution of each cylinder to overall performance of a combustion engine."; column 6, line 45, for "in" read -- is --.

Signed and sealed this 30th day of October 1962.

(SEAL)
Attest:

ERNEST W. SWIDER                                               DAVID L. LADD
Attesting Officer                                                Commissioner of Patents